United States Patent
Chen et al.

(10) Patent No.: US 9,632,006 B2
(45) Date of Patent: *Apr. 25, 2017

(54) DISTRIBUTED FIBER BEND AND STRESS MEASUREMENT FOR DETERMINING OPTICAL FIBER RELIABILITY BY MULTI-WAVELENGTH OPTICAL REFLECTOMETRY

(71) Applicant: General Photonics Corporation, Chino, CA (US)

(72) Inventors: Hongxin Chen, Chino, CA (US); Xiaojun Chen, San Gabriel, CA (US); Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/301,259

(22) Filed: Jun. 10, 2014

(65) Prior Publication Data

US 2014/0362367 A1 Dec. 11, 2014

Related U.S. Application Data

(60) Provisional application No. 61/833,441, filed on Jun. 10, 2013.

(51) Int. Cl.
*G01M 11/00* (2006.01)

(52) U.S. Cl.
CPC .... *G01M 11/3127* (2013.01); *G01M 11/3145* (2013.01)

(58) Field of Classification Search
CPC .... G01M 11/088; G01M 11/30; G01M 11/31; G01M 11/3109; G01M 11/3118;
(Continued)

(56) References Cited

U.S. PATENT DOCUMENTS

| 4,685,799 A * | 8/1987 | Brininstool | G01M 11/335 356/73.1 |
| 6,456,370 B1 * | 9/2002 | Ingles, Jr. | G01M 11/088 356/73.1 |

(Continued)

FOREIGN PATENT DOCUMENTS

| EP | 0 320 255 A2 | 6/1989 |
| EP | 2 720 388 A1 | 4/2014 |

(Continued)

OTHER PUBLICATIONS

Corsi, F, et al., "Beat Length Characterization Based on Backscattering Analysis in Randomly Perturbed Single-Mode Fibers," Journal of Lightwave Technology, 17(7):1172-1178, Jul. 1999.

(Continued)

*Primary Examiner* — Gordon J Stock, Jr.
(74) *Attorney, Agent, or Firm* — Perkins Coie LLP

(57) ABSTRACT

The disclosed technology in this patent document includes, among others, methods apparatus for distributed measuring at least one fiber bend or stress related characteristics along an optical path of fiber under test (FUT) uses both a light input unit and a light output unit connected to the FUT at one single end.

14 Claims, 4 Drawing Sheets

(58) Field of Classification Search
CPC ......... G01M 11/3127; G01M 11/3136; G01M 11/3145; G01M 11/3154; G01M 11/3163; G01M 11/3172; G01M 11/3181; G01M 11/319

See application file for complete search history.

(56) References Cited

U.S. PATENT DOCUMENTS

| | | | |
|---|---|---|---|
| 6,724,469 | B2 | 4/2004 | Leblanc |
| 6,856,400 | B1 | 2/2005 | Froggatt |
| 7,920,253 | B2 | 4/2011 | Cyr et al. |
| 8,149,419 | B2 | 4/2012 | Fan et al. |
| 8,164,831 | B2 | 4/2012 | Yao et al. |
| 9,097,615 | B2 * | 8/2015 | Xia .................... G01M 11/3127 |
| 2006/0204165 | A1 | 9/2006 | Froggatt |
| 2008/0002187 | A1 | 1/2008 | Froggatt |
| 2008/0007718 | A9 | 1/2008 | Froggatt et al. |
| 2011/0090486 | A1 | 4/2011 | Udd |
| 2011/0320147 | A1 | 12/2011 | Brady et al. |
| 2012/0042696 | A1 * | 2/2012 | Tanigawa ........... G01M 11/3145 65/378 |
| 2012/0092651 | A1 * | 4/2012 | Molin .................. G01M 11/088 356/73.1 |
| 2014/0146312 | A1 * | 5/2014 | Perron ............... G01M 11/3118 356/73.1 |
| 2014/0176937 | A1 | 6/2014 | Liu et al. |
| 2016/0123837 | A1 * | 5/2016 | Chen ................... G01M 11/088 356/73.1 |

FOREIGN PATENT DOCUMENTS

| | | |
|---|---|---|
| WO | 2013/023425 A1 | 2/2013 |
| WO | 2014/201057 A2 | 12/2014 |

OTHER PUBLICATIONS

Cyr, N., "Polarization-Mode Dispersion Measurement: Generalization of the Interferometric Method to Any Coupling Regime," Journal of Lightwave Technology, 22(3):794-805, Mar. 2004.

Cyr, N., et al., "Random-Scrambling Tunable POTDR for Distributed Measurement of Cumulative PMD," Journal of Lightwave Technology, 27(18):4164-4174, Sep. 2009.

Faustini, L., et al., "Bend Loss in Single-Mode Fibers," Journal of Lightwave Technology, 15(4):671-679, Apr. 1997.

Galtarossa, A., et al, "Statistical characterization of fiber random birefringence," Optics Letters, 25(18):1322-1324, Sep. 2000.

Galtarossa, A., et al., "Measurement of Local Beat Length and Differential Group Delay in Installed Single-Mode Fibers," Journal of Lightwave Technology, 18(10):1389-1394, Oct. 2000.

Galtarossa, A., et al., "Single-End Polarization Mode Dispersion Measurement Using Backreflected Spectra Through a Linear Polarizer," Journal of Lightwave Technology, 17(10):1835-1842, Oct. 1999.

Gardner, W.B., "Microbending Loss in Optical Fibers," The Bell System Technical Journal, 54(2):457-465, Feb. 1975.

International Search Report and Written Opinion mailed on Feb. 19, 2015 for International Application No. PCT/US2014/041798, filed Jun. 10, 2014 (9 pages).

JDSU, "Macrobend Detection Using an OTDR," JDS Uniphase Corporation, White Paper, 4 pages, (2007).

Kim, B.Y., et al., "Backscattering measurement of bending-induced birefringence in single mode fibres," Electronics Letters, 17(5):193-194, Mar. 1981.

Li, M. -J., et al., "Ultra-Low Bending Loss Single-Mode Fiber for FTTH," Journal of Lightwave Technology, 27 (3):376-382, Feb. 2009.

Palmieri, L., et al., "Distributed Characterization of Bending-Induced Birefringence in Spun Fibers by means of P-OFDR," Conference on Optical Fiber Communication, collocated National Fiber Optic Engineers Conference (OFC/NFOEC), San Diego, CA, Paper OWS2, pp. 1-3, Mar. 2010.

Poole, C.D., et al., "Polarization-Mode Dispersion Measurements Based on Transmission Spectra Through a Polarizer," Journal of Lightwave Technology, 12(6):917-929, Jun. 1994.

Smith, A.M., "Birefringence induced by bends and twists in single-mode optical fiber," Applied Optics, 19 (15):2606-2611, Aug. 1980.

Sunnerud, H., et al., "Measurement of Polarization Mode Dispersion Accumulation Along Installed Optical Fibers," IEEE Photonics Technology Letters, 11(7):860-862, Jul. 1999.

Sunnerud, H., et al., "Polarization-Mode Dispersion Measurements Along Installed Optical Fibers Using Gated Backscattered Light and a Polarimeter," Journal of Lightwave Technology, 18(7):897-904, Jul. 2000.

Ulrich, R., et al., "Bending-induced birefringence in single-mode fibers," Optics Letters, 5(6):273-275, Jun. 1980.

Wang, Q., et al, "Theoretical and experimental investigations of macro-bend Losses for standard single mode fibers," Optics Express, 13(12):4476-4484, Jun. 2005.

Zendehnam, A., et al., "Investigation of bending loss in a single-mode optical fiber," Pramana—Journal of Physics, 74(4):591-603, Apr. 2010.

* cited by examiner

US 9,632,006 B2

DISTRIBUTED FIBER BEND AND STRESS MEASUREMENT FOR DETERMINING OPTICAL FIBER RELIABILITY BY MULTI-WAVELENGTH OPTICAL REFLECTOMETRY

CROSS REFERENCE TO RELATED APPLICATIONS

This patent document claims the benefit of priority of U.S. Provisional Patent Application No. 61/833,441 entitled "DISTRIBUTED FIBER BEND AND STRESS MEASUREMENT FOR DETERMINING OPTICAL FIBER RELIABILITY BY MULTI-WAVELENGTH OPTICAL REFLETOMETRY" and filed on Jun. 10, 2013. The entire content of the before-mentioned patent application is incorporated by reference as part of the disclosure of this document.

TECHNICAL FIELD

This patent document relates to fibers and characterization of fibers in various fiber systems and fiber devices.

BACKGROUND

An optical fiber tends to be subject to bending, forces or stresses in applications. For example, fibers used for an optical network or fiber communication link, such as International Telecommunication Union recommended ITU-T G.652 single-mode optical fiber and cable, would suffer a fiber bend or stress loss which may adversely affect the performance or reliability of the fiber. Such fiber bending or stress could be measured by a commercial multiple-wavelength optical time domain reflectometer (OTDR), e.g. at 1310 nm or 1550 nm, to distinguish a bend loss from other losses, e.g. broken or connection loss, by use of the measured bend or stress induced loss difference information at different wavelengths. Such measurement is based on a bigger mode field diameter at a longer wavelength, thus for the most installed telecom optical fiber a bend or stress induced loss is higher at a longer wavelength, for example a bend loss at 1550 nm is bigger than that at 1310 nm.

SUMMARY

In one aspect, a method is provided for using optical time domain reflectometer (OTDR) to measure a fiber link under test and includes operating a light source to produce probe light at different optical wavelengths; directing the probe light into a fiber link under test; directing reflected probe light from the fiber link under test into an optical detector to produce a detector signal; and processing information from the detector signal to determine a fiber bend or stress present in the fiber link under test. The processing includes computing a first optical power difference in reflected optical signals from two different locations in the fiber under test at each of two or more different optical wavelengths; computing a second optical power difference in reflected optical signals from each of the two different locations in the fiber under test at the two different optical wavelengths; using the information on the first and second optical power differences to obtain optical loss caused by a fiber bend or stress present in the fiber link under test; and using the optical loss caused by a fiber bend or stress present in the fiber link under test to determine a parameter of the fiber bend or stress.

This and other aspects and their implementations are described in greater detail in the drawings, the description and the claims.

DETAILED DESCRIPTION

Figure 1:
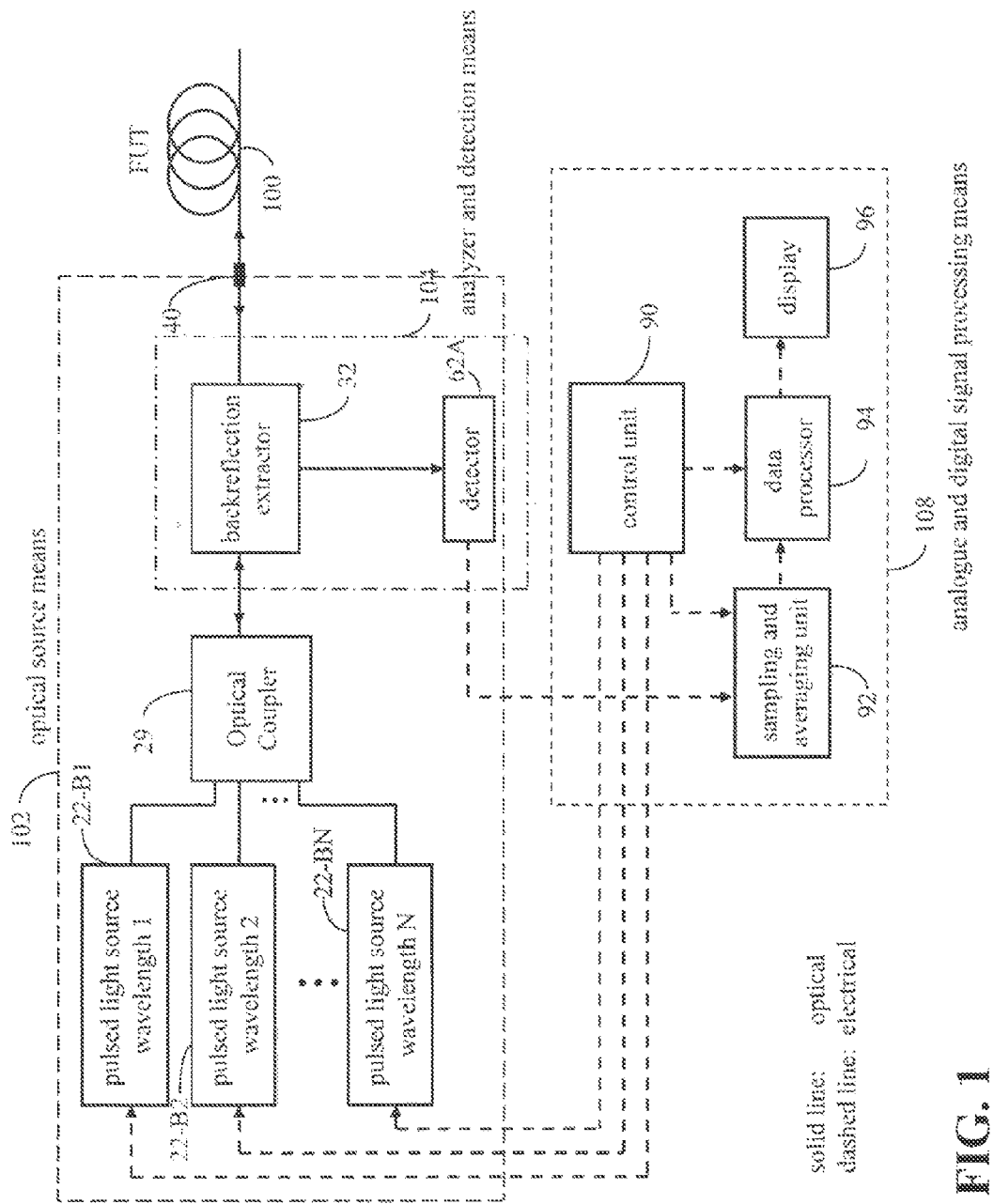
FIG. 1 is an example of a schematic diagram of a high spatial resolution multi-wavelength OTDR embodying an aspect of the disclosed technology.

The disclosed technology in this patent document includes, among others, methods apparatus for distributed measuring at at least one fiber bend or stress related characteristics along an optical path of fiber under test (FUT) uses both a light input unit and a light output unit connected to the FUT at one single end. The disclosed technology provides, for example, methods and devices for measuring distributed bend- or stress-dependent characteristics of optical paths and can be applicable to the distributed measurement of bend parameters, for example, bend or stress radius, bend or stress length, bend or stress strength, fiber reliability and or quality, etc., and or fiber loss or attenuation difference between at least two wavelengths at a particular fiber distance, i.e. position or length, of an optical path which comprises mostly optical waveguide, such as an optical fiber or cable link, for example, for an optical fiber used for the optical network such as fiber to the home (FTTH) or any access optical network (FTTx) or multi-dwelling unit (MDU).

One aspect of the disclosed technology is the light input unit injects at least two different wavelengths, the short-wavelength ($\lambda_S$) and long-wavelength ($\lambda_L$), into the FUT. The input light at different wavelengths may be injected into the FUT in different ways, for example, sequential injection of one wavelength at a time by one after another or simultaneously injecting the different wavelengths. The output light unit extracts corresponding light from the FUT, analyzes and detects the extracted output light power, and processes the corresponding electrical signal to obtain transmitted optical power at each distance along the length of the FUT. A processing unit is provided to process the signals from the output light unit and computes at least one power difference in a measured power parameter corresponding to each of two distances from at least two different wavelengths, for example short-wavelength ($\lambda_S$) and long-wavelength ($\lambda_L$), respectively, the measured power difference parameter at a pair of distances being proportional to local fiber loss or attenuation parameter. The processing unit calculates the at least one bend or stress related FUT characteristics, for example, bend or stress radius, bend or stress strength, etc., as at least one predetermined function of the fiber loss (or loss difference) parameter value, and determines the measurement of the at least one bend or stress related FUT parameter, for example, a fiber bend or stress length. The processing unit further computes at least one bend or stress related fiber characteristics, for example, a mechanical reliability and or an expected lifetime and or a failure rate statistics from macro-bend or stressed for the optical networks, for example, optical fiber or cable for the home (FTTH) or multi-dwelling unit (MDU) scenarios, as at least one predetermined function of the at least one bend or stress related FUT parameter, for example, macro-bend or stress radius or bend or stress strength along an optical fiber or cable path. The disclosed technology also provides methods for an instrument calibration or reference procedure of the fiber bend or stress information, for example, fiber bend or stress coefficient, for unknown fiber type by adding at least one known bend information, for example, the fiber bend or stress radius or strength, on an optical fiber or cable under test. Such an instrument calibration or reference procedure for the FUT can be used to acutely measure and characterize any fiber macro-bend or stress related bend characteristics on the FUT.

Another aspect of the disclosed technology includes an identification of fiber type along an optical FUT path from measured at least one macro-bend related information, for example, bend induced fiber loss, bend induced fiber birefringence, and others, by adding additional known macrobend, for example, bend radius, on a FUT by using both a light input unit and a light output unit connected to the FUT at one single end.

Some commercial fibers used for access optical networks (FTTx) or multi-dwelling unit (MDU), e.g., recently developed new bend insensitive optical fiber such as the International Telecommunication Union's recommendation G.657 (Characteristics of a bending-loss insensitive single-mode optical fibre and cable for the access network) can be subject to significantly macro-bend without exhibiting any noticeable bend loss, and, therefore, it would be difficult for various currently commercial available OTDR systems to measure this type of fiber bend using various existing techniques. This is in part because there is nearly no or negligible macro-bend induced loss, for example, in the optical spectrum at 1310 nm or 1550 nm, but the fiber may still be subject a macro-bending or stress or significantly macro-bending or stress from a poor fiber installation that may result a poor fiber reliability so as to short a fiber lifetime or even failure for networks. In practical fiber deployment, strongly macro-banded or stressed fiber could adversely affect the installed fiber quality and reliability, or could reduce a lifetime for the fiber. In various applications, it is desirable to measure such fiber macro-bend characteristics to estimate the fiber properties to provide an assessment on the fiber reliability or estimate on a fiber lifetime or a fiber failure statistics for a fiber network, e.g. for FTTH, FTTx, MDU, etc., and or for a quality analysis and a lifetime estimation. The disclosed technology can be used to advantageously identify a bend-caused loss and a bend characteristics and thus provides the capability beyond some existing OTDR methods.

In properly characterizing fiber macro-bands or stresses, it is important to estimate the fiber local bend or stress prosperities, e.g. bend radius, bend or stress length, bend or stress strength, etc., for a communications optical fiber cable link, e.g. using G.652 or G.657 fiber, so that it could be possible to accurately estimate an installed fiber reliability or quality or lifetime. In particular, due to r widely deployment of bend insensitive optical fiber for the optical network, for example, the FTTH access network, such bend insensitive optical fiber tends to exhibit no or negligible bend loss at the common used communication wavelengths (e.g., 1310 nm and 1550 nm). In such deployment, the deployed fiber may still be highly bended and such macro-bend may cause a problem for the fiber quality or even shorting the fiber life time. Therefore, testing and measuring the fiber bend properties can be important for current optical networks such as the FTTH access network when the bend insensitive optical fiber, for example G.657, is installed.

The disclosed technology in this document can be implemented to meet those and other needs for characterizing bend- or stress-related fiber characteristics as a function of distance along a fiber link, e.g., a link from a single-end of the FUT, that can be used for the field test and measurement for the optical networks, for example, FTTH, FTTx, MDU, etc.

For example, one test method to measure fiber bend or stress is to measure a bend induced birefringence, where the birefringence can be induced by the fiber bend or stress during the installation and is proportional to $1/R^2$, where R is the bend radius, so that it is possible to determine bend properties. Highly bent fiber would reduce the fiber lifetime or even to cause a fiber broken. This issue is particularly problematic for the highly bent installed optical fiber at home for the FTTH application. Thus, it is desirable to be able to obtain the local bend or stress characteristics or it is best to find local bend or stress properties at each fiber distances, for example, bend radius, bend or stress length, bend or stress strength, etc., along the optical fiber or cable.

Depending on the application, it is often desirable to measure the bend or stress induced fiber loss at specified wavelengths for an estimation of bend- or stress-related properties at a given distance. However, in many practical cases, it is not possible to measure the fiber loss at a given precision position by commercial available OTDR. This is because there may be no or negligible loss for the bend insensitive fiber, for example, for wavelengths at 1310 nm and 1550 nm, or due to a poor spatial resolution from an OTDR, for example a commercial OTDR has a limited spatial resolution of as large as 50 cm for designed wavelengths but a typically bend or stress length may be of a few mm to few cm, and hence it is not possible to obtain a reliable determination of the bend properties. The fiber loss or attenuation is varied as a function of the wavelength and the macro-bend loss should be higher at the longer wavelength. Hence, measurements at different wavelengths provide useful information.

It should also be noted distributed PMD can be measured by the fixed analyzer or equivalently wavelength scanning method which tends to take long measurement times and suffer reliability problem of fiber polarization fluctuation during the testing. An early successful commercial test and measurement instrument (FTB-5600, EXFO Inc.) for the field distributed PMD measurement was using randomscrambling technique, where many uncorrelated measurements are performed for many "closely-spaced optical frequency pairs" over a large wavelength to estimate a distributed cumulative PMD along the fiber so as to significantly reduce the measurement sensitivity to moving of the test fiber. However, it can be difficult for such a measurement technique to provide distributed bend or stress or bend or stress induced birefringence information, and as well such method is limited to have a long spatial resolution of greater than 5 m.

The disclosed technology can be used for, in some implementations, characterizing high spatial resolved wavelength-dependent loss and or bend- or stress-dependent characteristics as a function of distance along a fiber link from a single-end of the FUT that could also distinguish fiber type between a traditional optical fiber, e.g. a SMF-28, a bend insensitive optical fiber, etc.

The disclosed technology can be implemented in ways that can eliminate, or at least mitigate, the disadvantages or limitations discussed above. The disclosed methods or devices can be used to provide more effective or alternative fiber characterization.

In one aspect of the disclosed technology, there is provided a method of estimating at least one bend- or stress-related characteristics of an optical path by measuring wavelength-dependent-losses at least two different wavelengths using light input means and light output means connected to the optical path at adjacent end, the light input means comprising light source means for supplying at least partially coherent light and light incident means for injecting said light into the FUT, and output light means comprising means for extracting corresponding light from the FUT, detection means for detecting the output power of extracted light corresponding to the at least two wavelengths to provide transmitted optical power difference at each distance of an optical path in each pair of distances, wherein the short-distance ($z_S$) and long-distance ($z_L$) said distances in each said group of distances being closely-spaced and analyzing means for analyzing said each optical power differences at each distances of an optical path in said each distance pair for each said at least two different wavelengths; and wherein the source, detection and analyzing means are at the same end of the FUT and the light source comprises either temporal pulses (or tunable CW narrow linewidth coherent lights); and wherein the said optical power difference parameter for said each at least two different wavelengths is different between the respective said at least two wavelengths, the method including the steps of:

i. Computing an optical power difference in a measured power parameter corresponding to each distance in said each pair of distances for each of the said at least two wavelengths at least one wavelength is a long wavelength, for example beyond 1600 nm, said measured power parameter being proportional to the power of the said analyzed and subsequently detected light, and wherein the said optical power difference is a fiber loss or fiber attenuation;

ii. Computing at least one different optical power difference (loss) between said at least two different wavelengths as a function of fiber distance, and distinguishing the macro-bend induced fiber loss from other losses;

iii. Calculating the value of bend- or stress-related FUT characteristic, for example bend radius, bend or stress strength, as at least one predetermined function of a said fiber loss or attenuation value at least one corresponding optical wavelength at a longer wavelength or a fiber bend loss or attenuation difference between two different wavelengths, said predetermined function being dependent upon the small fiber distance or length difference between the distances corresponding to the closely-spaced fiber positions or locations;

iv. Computing the bend or stress parameter may also include a bend or stress length that is measured from the said different optical power difference (loss) according to the bend induced wavelength-dependent loss parameter at the at least one wavelength, from the longest wavelength, from the measured fiber loss or attenuation parameter, for example by using a high spatial resolved OTDR; and v. Computing and outputting the value of the at least one bend or stress related fiber characteristic, for example, a mechanical reliability or an expect lifetime or a failure rate statistics for bended or stressed fiber to the home (FTTH) or multi-dwelling unit (MDU) scenarios, as at least one predetermined function of the one bend- or stress-related FUT characteristic along an optical fiber path.

In implementations, for measurements of wavelength-dependent fiber loss at a specified distance z for each said group comprises distance pairs having substantially said prescribed central distance, and the said bend-related FUT characteristic is computed from a wavelength dependent loss value, $\Delta L_{\lambda_j\text{-}dB}(z,\lambda)$ at the at least one wavelength that may be measured at L or UL band of the telecommunication bands or even beyond, i.e. longer than L or U band wavelength or even greater than 1675 nm, for a bend distance $\Delta z$.

The bend parameter may be computed by the bend or stress induced loss $\Delta L_{\lambda_j\text{-}dB}(z,\lambda)$ at a given wavelength for a bend distance $\Delta z$. The bend or stress parameter may be a bend radius or bend or stress strength that is computed from the bend or stress induced wavelength-dependent loss parameter, $\Delta L_{\lambda_j\text{-}dB}(z,\lambda)$, at a given wavelength, $\lambda$, from a long wavelength, and the predetermined function according to the following formula, $$R(z) = R_{th} - \frac{\Delta L_{\lambda_j\text{-}dB}(z,\lambda)}{\eta(\lambda) \cdot \Delta z}$$

where the $R(z)$ is the bend radius, the $R_{th}$ is defined as a "threshold" bend radius where for this "threshold" bend radius there is no any or negligible bend or stress induced attenuation or loss on the optical fiber, and the $\eta(\lambda)$ is the fiber type related bend or stress coefficient or simple as a fitting coefficient. Note that $R_{th}$ and $\eta(\lambda)$ could either from theoretical numerical simulations or from experimental calibrations, for example for a given optical fiber the $R_{th}$ and $\eta(\lambda)$ can be obtained from at least two bend induced loss measurements for two different bend radius. The $\Delta L_{\lambda_j\text{-}dB}(z,\lambda)$ is a bend or stress induced loss without any non bend- or stress-related losses and depends on the optical wavelength, $\lambda$, and fiber properties, e.g. fiber cladding radius, refraction index, etc., $\Delta z$ is the bend distance or a portion of bend or stress length.

The bend radius or bend or stress strength may be computed from the bend induced loss parameter, $\Delta L_{\lambda_j\text{-}dB}(z,\lambda)$, from the longest wavelength according to the predetermined function.

The bend radius or bend or stress strength may be computed from the bend induced loss parameters, $\Delta L_{\lambda_j\text{-}dB}(z,\lambda)$, from at least one or advantageously more wavelengths according to the predetermined function so that an improved instrument performance may be achieved.

The measurement can be performed by a high resolution OTDR, for example using a very short light pulse and a wide bandwidth detection OTDR, or photon-counting OTDR, or tunable CW narrow linewidth coherent lights based optical frequency domain reflectometer (OFDR).

In implementations, for measurement of at least one bend or stress related fiber characteristics, for example, a mechanical reliability or an expect lifetime or a failure rate statistics for bending of fiber, is calculated as one predetermined function of the at least one bend or stress related FUT characteristics along an optical fiber path.

The bend radius or bend or stress strength may also be computed from the bend or stress induced loss parameter, $\Delta L_{\lambda_j\text{-}dB}(z,\lambda)$, from only one wavelength loss measurement according to the predetermined function assuming the loss parameter measured from the said one wavelength may be bend or stress induced fiber loss or attenuation or may mainly or major come from the fiber macro-bend or stress. Accordingly, a low-cost simple instrument can be realized by only using one wavelength laser to measure the bend or stress induced loss and such wavelength could be at any wavelength within telecom bands but advantageously in some implementations the wavelength can be a long wavelength, for example >1625 nm or even >1675 nm OFDR or OTDR instrument. Indeed it could be a test and measurement situation if the loss induced from bend or stress could be identified without using the second wavelength loss information, for example it is known there is no any other loss except for the bend or stress induced loss.

In implementations, measurements based on one optical wavelength or at least two optical wavelengths may be used. For example, in one implementation of measurements using two wavelengths, the measurements at the first wavelength can be used to obtain the main measurements for the loss measurement according to the predetermined function while the measured loss parameter from the second wavelength may be mainly used to identify the loss type, for example bend or stress induced fiber loss or attenuation although two wavelength fiber loss or attenuation information could improve the measurement reliability so as to improve the instrument performance.

The bend or stress induced fiber loss or attenuation could be extracted from a fiber total loss subtracting the non-bend or non-stress related loss and such non-bend or non-stress related loss could be obtained from any means, for example a reference measurement for the FUT without any bend or stress, or a fiber loss from a location that is close to the bend or stress position or even far away from the bend or stress location as long as a relationship between the measured fiber loss and the non-bend or non-stress loss may be known. The bend or stress induced loss parameter(s), $\Delta L_{\lambda_j\text{-}dB}(z,\lambda)$, from the said wavelength(s) is the measured total loss to subtract these non-bend or non-stress related loss(es).

The bend or stress induced fiber loss or attenuation parameter for the predetermined function to compute the bend or stress parameter, for example, the bend radius or bend or stress strength, could be partially bend or stress induced fiber loss or attenuation from the given bend or stress distance, $\Delta z$, for example $\Delta z$ is the difference between the short-distance ($z_S$) and long-distance ($z_L$), i.e. $\Delta z = |z_L - z_S|$.

It should be noted that a bend radius may not be a radius and may be any bend or stress related strength parameter.

The disclosed technology can be implemented to provide a method to obtain the $R_{th}$ and $\eta(\lambda)$ coefficients either from theoretical numerical simulations or from experimental testing, for example for a given optical fiber the $R_{th}$ and $\eta(\lambda)$ can be obtained from at least two bend induced loss measurements from at least one wavelength for at least two different bend radius and then the $R_{th}$ and $\eta(\lambda)$ could be extracted according to the said formula $$R(z) = R_{th} - \frac{\Delta L_{\lambda_j\text{-}dB}(z,\lambda)}{\eta(\lambda)\cdot \Delta z};$$

or the $R_{th}$ and $\eta(\lambda)$ can be obtained from at least two bend induced loss measurements for two different wavelengths for at least one bend radius and then the $R_{th}$ and $\eta(\lambda)$ could be extracted according to the said formula $$R(z) = R_{th} - \frac{\Delta L_{\lambda_j\text{-}dB}(z,\lambda)}{\eta(\lambda)\cdot \Delta z}.$$

A second aspect of the method is to provide an identification of fiber type along an optical FUT path from measured at least one macro-bend or stress related information, for example bend induced wavelength-dependent fiber loss, and or bend induced fiber birefringence, etc., by adding additional known macro-bend, for example a bend radius, on a FUT by using both a light input unit and a light output unit connected to the FUT at one single end.

In a third aspect of the disclosed technology, a measurement instrumentation is provided for measuring at least one wavelength-dependent-loss bend- or stress-related characteristics of an optical path to include input light means and output light means connected to the optical path at adjacent end, the light input means comprising light source means for supplying at least partially coherent light and light incident means for injecting said light into the FUT, and output light means comprising means for extracting corresponding light from the FUT, detection means for detecting the output power of extracted light corresponding to the at least two wavelengths to provide transmitted optical power difference at each distance of an optical path in each distance pair, analyzing means for analyzing said each optical power difference at each distance of an optical path in said each distance pair for each said at least two different wavelengths, and processing means for processing the electrical signals from the output light means to determine said at least one wavelength-dependent-loss bend- or stress-related characteristic. The processing means performs the following processing:

i. Computing an optical power difference in a measured power parameter corresponding to each distance in said each pair of distances for each of the said at least two wavelengths at least one wavelength is a long wavelength, for example beyond 1600 nm, said measured power parameter being proportional to the power of the said analyzed and subsequently detected light, and wherein the said optical power difference is a fiber loss or fiber attenuation;

ii. Computing at least one different optical power difference (loss) between said at least two different wavelengths as a function of fiber distance, and distinguishing the macro-bend induced fiber loss from other losses;

iii. Calculating the value of bend- or stress-related FUT characteristic, for example bend radius, bend or stress strength, as at least one predetermined function of a said fiber loss or attenuation value at least one corresponding optical wavelength at a longer wavelength or a fiber bend loss or attenuation difference between two different wavelengths, said predetermined function being dependent upon the said small fiber distance or length difference between the distances corresponding to the said closely-spaced fiber positions or locations;

iv. Computing the said bend or stress parameter may also include a bend or stress length that is measured from the said different optical power difference (loss) according to the said bend induced wavelength-dependent loss parameter at said at least one wavelength, e.g., from the longest wavelength, from the said measured fiber loss or attenuation parameter, for example by using a high spatial resolved OTDR; and v. Computing and outputting the value of said at least one bend (macro-bend) or stress related fiber characteristics, for example, a mechanical reliability and or an expect lifetime and or a failure rate statistics for bended or stressed fiber of fiber to the home (FTTH) or multi-dwelling unit (MDU) scenarios, as at least one predetermined function of said one bend-related FUT characteristic along an optical fiber path.

The measurement instrumentation also provides a method to obtain the said $R_{th}$ and $\eta(\lambda)$ coefficients either from experimental testing, for example for a given optical fiber the $R_{th}$ and $\eta(\lambda)$ can be obtained from at least two bend induced loss measurements from at least one wavelength for at least two different bend radius and then the $R_{th}$ and $\eta(\lambda)$ could be extracted according to the said formula $$R(z) = R_{th} - \frac{\Delta L_{\lambda_j - dB}(z, \lambda)}{\eta(\lambda) \cdot \Delta z};$$

or the $R_{th}$ and $\eta(\lambda)$ can be obtained from at least two bend induced loss measurements for two different wavelengths for at least one bend radius and then the $R_{th}$ and $\eta(\lambda)$ could be extracted according to the formula below:

$$R(z) = R_{th} - \frac{\Delta L_{\lambda_j - dB}(z, \lambda)}{\eta(\lambda) \cdot \Delta z}.$$

FIGS. 1-4 show examples of a high spatial resolution OTDR devices or systems based on the disclosed technology, which can be advantageously used for various measurements including, e.g., single-ended measurements of the optical fiber bend or stress for the FTTx test, measurement and monitoring applications.

The examples include, among other components, (i) an optical source controller, (ii) an analyzer and detection unit, (iii) an analogue and digital signal processing unit, together with one single control unit, where all of the components of the measuring instrument are at the single (same) end of the FUT. Different examples may be implemented with various differences in configurations according to the different fiber bend measurement methods such as a fiber long wavelength loss measurement based fiber bend determination method. For example to select a wavelength in L or U bands or even >1675 nm that can have a measurable fiber loss that is induced from a fiber macro-bend while probably there may be now any or have negligible loss at telecomm wavelengths, for example at 1310 nm, 1490 nm and 1550 nm.

Figure 3:
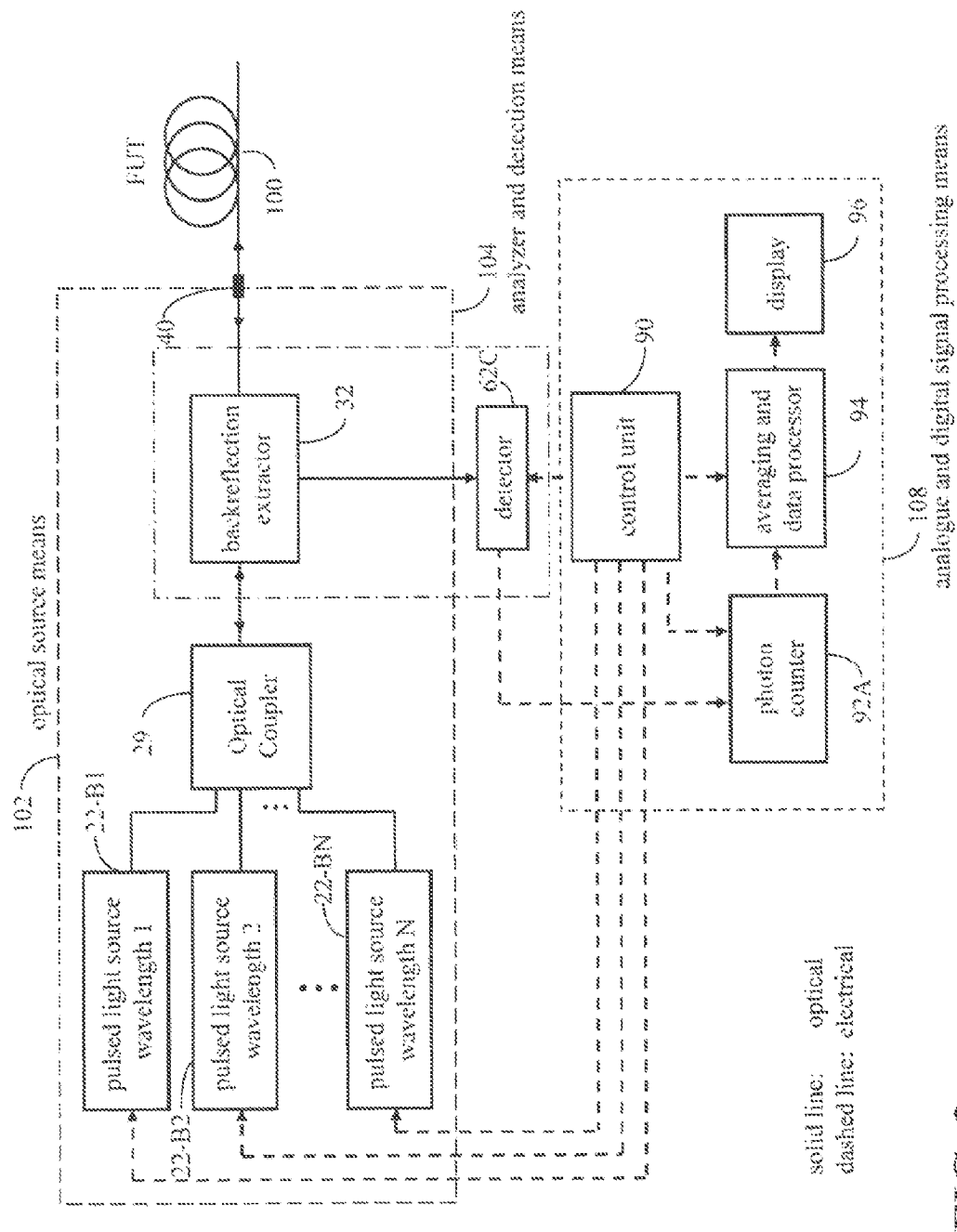
FIG. 3 is an example of a high spatial resolution multi-wavelength photon counting OTDR embodying an aspect of the disclosed technology.

For the multi-wavelength high spatial-resolved optical time domain reflectometer (OTDR) as illustrated in an embodiment of FIG. 1 includes different pulsed light sources at different wavelengths, e.g. 22-B1, 22-B2, . . . , 22-BN, which are also used as light sources in the example shown in FIG. 3. Each light source may be a laser such as a DFB laser, a Fabry-Perot diode laser or other laser to enable selecting different central wavelength lasers for the OTDR acquisition, for example, 1550 nm, 1675 nm, or a wavelength longer than 1700 nm. A power splitter means or device 29 such as an optical coupler is provided to combine light of different wavelengths as the probe light directed to the FUT 100. An optical circulator or coupler 32 is provided as a backreflection extractor between the optical splitter or coupler device 29 and the FUT 100 to direct the back reflection of the light from the FUT 100 to an optical detector 62A. This optical circulator or coupler 32 represents an optical unit that includes a first optical port to receive the probe light produced by the light source, a second optical port coupled to FUT 100 to direct the probe light received at the first optical port to the FUT 100 and receive reflected probe light from the FUT 100, and a third optical port that outputs the received reflected probe light to the optical detector 62A. A signal condition circuit (e.g., sampling and averaging unit) 92 is coupled to receive the optical detector output from the optical detector 62A, a data processor means or unit 94 is to receive the output from the sampling and averaging unit 92 and a display is coupled to the data processor 94 to display information to a user. Those components are controlled by a control unit 90. The sampling and averaging unit 92 performs signal sampling and averaging that is synchronized with the light pulsed source 22-B1, or 22B2, . . . , or 22-BN via control 90. The light pulsed source 22-B1, . . . , 22-BN is launched into a fiber-under-test (FUT) 100 from a connector 40, which also receives corresponding backreflected light from the FUT 100 that are caused by Rayleigh scattering and, in some cases, discrete (Fresnel) reflections via the connector 40 in the reverse direction.

In addition to controlling the sampling in unit 92, the control unit 90 controls or selects the wavelength of the laser sources 22-B1, . . . , 22-BN. More specifically, for each setting k of the laser central wavelengths, the control unit 90 causes the backreflected power to be measured at least one pair of distances $z_S^{(k)}$ and $z_L^{(k)}$, respectively, that are closely-spaced relative to each other. The center distance of the distance pair is defined as the average of two actual distances, i.e., $z_C = (z_S^{(k)} + z_L^{(k)})/2$. The labels S and L refer to "short" and "long" with respect to the center distance $z_C$. A power difference in one pair of distances is a fiber loss (i.e. attenuation). The same computation may be performed for different OTDR trace at least another one wavelength. A loss difference is then known at least two different wavelengths, for example between 1550 nm and 1650 nm or 1675 nm (a wavelength beyond 1675 nm).

Figure 2:
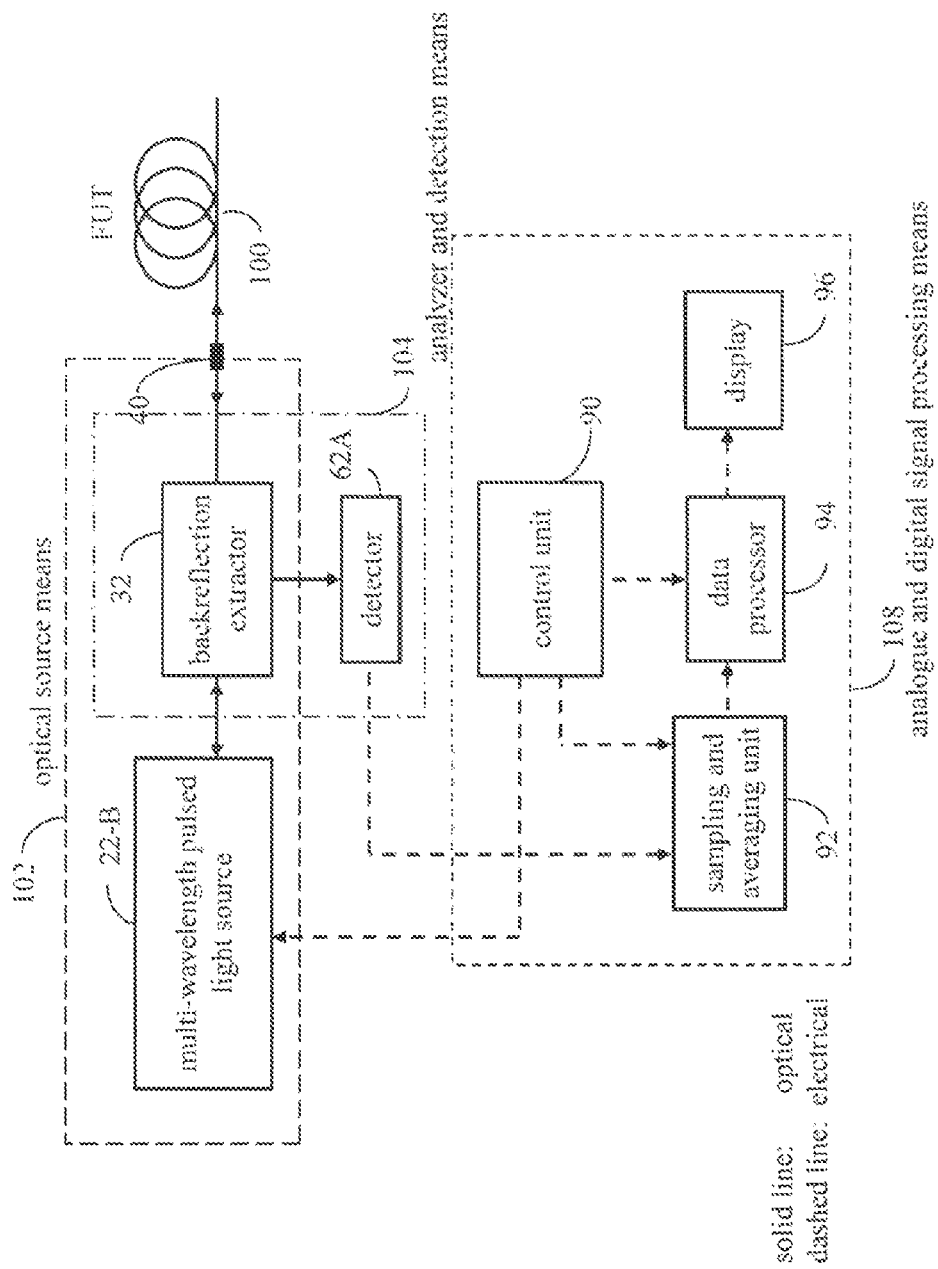
FIG. 2 is an example of a high spatial resolution multi-wavelength OTDR embodying an aspect of the disclosed technology.

Other different embodiments as shown in FIGS. 2 and 3 are also possible, where in FIG. 2 a multi-wavelength pulsed laser source 22-B, for example from a widely tunable laser, could be used to select different wavelengths for the OTDR acquisition, while in FIG. 3 a multi-wavelength high spatial-resolved photon-counting OTDR would be used for achieving a high spatial resolution where a counter 92A is used.

Due to the single-mode fiber has different mode field diameter (MDF) for different wavelengths and a mode field diameter increases via wavelength increases, for example a MFD at 1550 nm is bigger that of 1310 nm and a MFD at 1650 nm is bigger than that of at 1550 nm and 1310 nm and also a macro-bend loss is proportional to 1/MFD, and then there is a difference for the bend induced losses between different wavelengths, i.e. loss at a longer is higher than that of at short wavelength. Generally the other loss, e.g. splice loss, connection loss, has less sensitive to the wavelength, thus the bend induced loss can distinguished from other losses after its loss can be measured at least at two different wavelengths, e.g. at 1550 nm and 1650 nm or 1625 nm and 1675 nm, etc. Such losses can be measured by an OTDR as embodiments of FIGS. 1 and 2, photon-counting OTDR as embodiment of FIG. 3, or OFDR as shown in embodiment FIG. 4, etc.

After knowing the loss that is induced from macro-bending or stressing, a bend radius or a bend or stress strength can be estimated (see below section) and a bend or stress length may also be measured from an OTDR trace, in particular from a high spatial resolved OTDR or OFDR trace.

In some implementations, for an OTDR or OFDR design at least a one laser wavelength may be designed in the bend sensitive wavelength, e.g. a wavelength longer that 1625 nm or even beyond 1700 nm with properly photodetector. Such OTDR or OFDR design can have a sensitive detection for the bend induced loss although there may be no or negligible bend induced loss at a short wavelength, for example <1600 nm, so as to estimate the bend radius, or bend length, etc. This is particular important for testing the new developed and installed bend insensitive optical fiber which may have a negligible losses at short communication wavelengths at 1310 nm, 1490 nm and 1550 nm from fiber macro-bend, but it may be possible to have some measurable bend loss if its loss is measured at a long wavelength, e.g. beyond 1600 nm in the L band or UL band, or even >1650 nm or 1700 nm and such wavelength laser (e.g. DFB) and photodetector are commercially available.

For optical fiber loss (attenuation) based fiber macro-bend determination method in a long wavelength, e.g. > in the C, or L, or U bands, or >1675-1725 nm, the input light controller will comprise a such light source, for example a narrow linewidth or moderately broadband light source either pulses or CW lights, that is injected into the FUT. The input light source is narrow or moderately broadband, or tunable, either a pulsed for the OTDR based embodiments or a CW tunable narrow linewidth laser source for the OFDR based embodiments. Thus, for a fiber loss based fiber bend estimation method the input light controller will comprise at least two lasers with two different wavelengths, in which at least one wavelength laser can have a measurable macro-bend induced fiber loss or attenuation. In some implementations, a long wavelength laser, e.g. DFB at wavelength ≥1650 nm, could be used for the bend induced loss measurement. Indeed this is particularly important for the bend characteristics estimation for the bend insensitive optical fibers. The laser can be any laser source that are injected into the FUT 100. The analyzer and detection unit may comprise an photodetector, e.g. APD. The analogue and digital signal processing unit may comprise a control, a data acquisition unit, a sampling and averaging unit and a data processor unit, analog-to-digital conversion being carried out in the sampling and averaging unit.

For the single-end fiber bend or stress measurement method a distributed fiber loss (i.e. attenuation) can be extracted by analyzing backreflected light power from Rayleigh backscattering so that the fiber bend characteristic can be extracted and predicated. For the fiber loss based fiber bend measurement method it is important to resolve the wavelength dependent fiber loss (attenuation) difference the fiber loss measurement may be performed at the bend loss sensitive wavelengths, for example in L or U band or beyond 1675 nm. To use the single-end measurement method to measure distributed fiber bend properties, however, OFDR or OTDR traces as a function of fiber length must be analyzed, a widely tunable narrow linewidth laser (CW) may be used for the OFDR to obtain high spatial-resolved OFDR traces, for example having a tunable range 0.01 nm to 100 nm and a linewidth of 100 Hz to 1000 GHz, or to use a short OTDR pulse for the OTDR, for example 0.01 ns to 1000 ns, in order to obtain OTDR traces with a high spatial resolution.

Examples of the main the fiber bend measurement methods and instrument configurations for single-end distributed fiber bend measurement, and modifications, alternatives and substitutions thereto, will now be described with reference to FIGS. 1 to 4.

Examples of the fiber macro-bend measurement methods can use a wavelength resolved fiber loss or attenuation to estimate or predict the fiber bend radius or bend strength. In particularly losses at least two different wavelengths are measured where there is a measurable loss at least one wavelength.

In the designed embodiments a macro-bend or stress can be known and distinguished from other OTDR or OFDR events, e.g. losses from connection, broken, etc., after the loss measurement is performed at least two different wavelengths, i.e. to use a wavelength resolved fiber loss or attenuation measurement where any fiber loss difference can be used to distinguish the bend loss from other losses, and a fiber loss or attenuation at a longer wavelength can be used for estimation or prediction of the fiber bend characteristics, such as radius or bend strength, etc. Advantageously it should be appreciated that such wavelength-dependent-loss based fiber bend analysis can be applied to use a long wavelength loss, e.g. at >1625 nm or even beyond 1675 nm, etc., to calculate the fiber bend radius or bend strength, in which a loss measurement in other wavelengths, e.g. at 1310 nm, 1550 nm, is negligible. Indeed it is true for the bend insensitive optical fiber that have nearly 'zero' attenuation from a related small bend radius at 1310 nm or 1550 nm but it could have some measurable bend induced loss at wavelength ≥1650 nm.

From an estimation of the fiber bend properties, the bend strength, bend radius, bend length, fiber reliability/quality and or fiber lifetime can be predicated as a function of the distance z along the FUT 100.

It will be appreciated that the usual conversions will be applied to convert time delay to distance according to refractive index of the FUT 100.

After knowing a loss from a fiber bend, for example at a long wavelength, it should be appreciated to be understood that a fiber bend characteristics, e.g. bend radius, bend strength, etc., can be estimated or computed by assuming to know the bend loss at a test wavelength and a fiber type, e.g. G.652 or G.657, etc. A bend length can be further estimated from a measured high spatial resolution OTDR or OFDR trace, for example to find a bend begin location, or a bend region, or bend length, etc. Indeed such bend measurement requires a high spatial resolution reflectometry, for example to use a very short OTDR pulse with a wide electronic bandwidth as illustrated in FIGS. 1 and 2, or a high spatial-resolved optical frequency domain reflectometer (OFDR) as illustrated in FIG. 4, or a photon-counting OTDR as illustrated in FIG. 3, etc.

Figure 4:
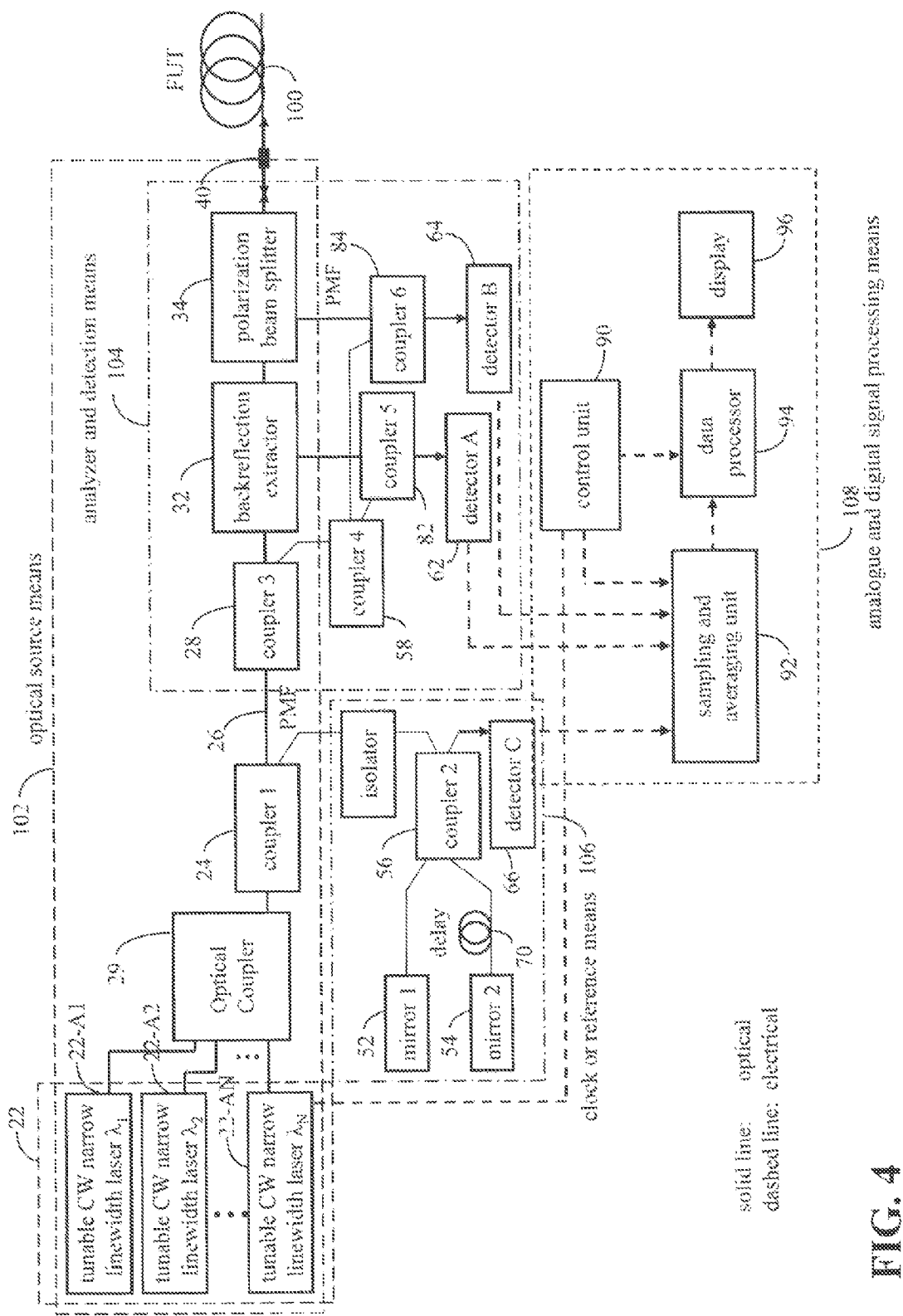
FIG. 4 is an example of a high spatial resolution multi-wavelength OFDR embodying an aspect of the disclosed technology.

The high spatial-resolved optical frequency domain reflectometer (OFDR) illustrated in FIG. 4 comprises a high coherent tunable CW narrow light source 22 that has a very narrow linewidth, e.g. to have a coherent length of tens to thousands meters, and can also select different central wavelengths by using, e.g., different tunable CW laser sources 22-A1, 22-A2, . . . , 22-AN with narrow linewidths, for example 1550 nm, 1675 nm, or >1700 nm etc., power splitter means 24 (coupler 1), sampling and averaging unit 92 and data processor means 94, all controlled by a control unit 90, and detection means comprising first and second detectors A and B, 62 and 64, respectively, and a clock means 106 consisting of a fiber based Michelson interferometer having a light beam splitter and combiner 56 (coupler 2), a delay 70, reflectors means of mirrors 52 and 54 and a detection means detector C 66. A tunable CW narrow light source means 22 is coupled to a polarization maintaining fiber (PMF) 26 for producing light source for launching into a fiber-under-test (FUT) 100 from connector 40, which also receives corresponding backreflected light from the FUT 100 via a connector 40.

The input light controller means 102 and analyzer and detection means 104 comprise a backreflected light extractor, specifically a polarization-maintaining circulator 32 in FIG. 4 or polarization-maintaining coupler, a polarization beam splitter (PBS) 34. The circulator 32 is coupled to the input of PBS 34 by a second PM fiber (polarization-maintaining fiber) so that the optical path from the tunable light source 22 to the PBS 34 is polarization-maintaining A single-mode fiber may be used to couple the PBS 34 to the I/O-SOP controller 36.

The alignment of PMF 26 is fixed in the factory in such a manner that substantially all of the optical power from the tunable CW narrow linewidth light source 22 is maintained in one of the two axes of the optical coupler 29 (e.g., a fiber coupler 29) and conventionally at the "slow" axis. Since the circulator 32 is polarization-maintaining, this alignment is maintained until the point between PBS 32. During attachment of each end of the PMFs to the components concerned, the azimuthal orientation of the PMF is adjusted to ensure maximum transmission of the optical lights towards the FUT 100.

Backreflected light caused by Rayleigh scattering and, in some cases, discrete (Fresnel) reflections, from the FUT 100 enters the instrument via the connection port 40 in the reverse direction.

In FIGS. 1-4, an analogue and digital signal processing means 108 is provided to include control unit 90, a sampling and averaging unit 92, a data processor 94 and a display 96. The sampling and averaging unit 92 receives one or more detector signals from the optical detector (62A in FIGS. 1-2, 62C in FIG. 3) or detectors (Detector A labeled as 62, Detector B labeled as 64 and Detector C labeled as 66). In addition to controlling the sampling in unit 92, the control unit 90 controls or selects the wavelength of the laser sources 22. More specifically, for each setting k of the laser central wavelengths, the control unit 90 causes the backreflected power to be measured at at least one pair of distances $z_S^{(k)}$ and $z_L^{(k)}$, respectively, that are closely-spaced relative to each other. The center distance of the distance pair is defined as the average of two actual distances, i.e., $z_C=(z_S^{(k)}+z_L^{(k)})/2$. The labels S and L refer to "short" and "long" with respect to the center distance $z_C$. A power difference in one pair of distances is a fiber loss (i.e. attenuation). The same computation may be performed for different OTDR or OFDR traces at at least another one wavelength. A loss difference is then known at at least two different wavelengths, for example between 1550 nm and 1650 nm or 1675 nm (a wavelength beyond 1675 nm).

It should be appreciated for the embodiments with the OFDR as in FIG. 4 that measure the beating signals between the local oscillation light, e.g. from the beam splitter 28 (coupler 3), and the reflected light signals from the FUT 100 in the time domain and then the measured signals are transferred into the frequency by A fast Fourier transform (FFT), the first step of the data processing is to perform the FFT for the acquired data from the detector A and B, 62A and 64A, respectively, and then it may require a calibration or reference procedure to obtain an OFDR trace that is a function of the distance. However, if for the OTDR this described procedure is not required, i.e. directly to obtain the OTDR curve as a function of the time and then of the distance of the test fiber (FUT) after considering the light speed at the given FUT, i.e. ROI. For the OFDR in order to remove or reduce the laser frequency sweeping nonlinearity, there may be a clock or reference means 106 that consists of a fiber based Michelson interferometer with a delay 1 70, Faraday rotation mirrors 52 and 54, and detector C 66. The clock or reference means may provide signals from the interferometer for sampling the measurement signals by sampling and averaging unit 92 or alternatively providing signal for re-sampling of the measurement signals from the FUT 100 as illustrated in FIG. 4.

It should be appreciated that, where the group may comprise more than one closely-spaced pair of distances, the center distance as defined above in fact differs for each pair in the group.

Different from the high spatial-resolved optical time domain reflectometer (OTDR) devices as illustrated in the examples in FIG. 1, FIG. 2 and FIG. 3, the OTDR in FIG. 4 includes two optical detectors 62 and 64 to receive optical signals from the backreflection extractor 32 and a polarization beam splitter 34, respectively. Additional optical couplers 58 (coupler 4), 82 (coupler 5) and 84 (coupler 6) are used to direct desired light signals from the optical coupler 28 (coupler 3), the backreflection extractor 32 and the polarization beam splitter 34 into detector 62 (detector A) and detector 64 (detector B). The OTDRs as illustrated in FIGS. 1, 2 and 3 may use a narrow light pulse width, for example 0.1 ns to 100 ns and a high detection bandwidth for the detector 62 and a high sampling rate for the ADC. In implementations, the relative low sampling rate ADC may be used if the time shifting sampling technique, for example for the 1 ns OTDR light pulse the ADC may have a sampling rate of 100 MSPS (under sampling) with an operation of 10 time shifting with a step of 1 ns, may be applied in the embodiments for the sake of the low-cost instrument design.

Before the operation of the multi-wavelength OTDR or OFDR based wavelength-dependent-loss measurement for the bend analysis is described in more detail, and with a view to facilitating an understanding of such operation.

Various other modifications to the above-described embodiments may be made. For instance the tunable laser source 22 could be replaced by some other means, for example widely tunable laser, discrete wavelength lasers, etc.

Measurements can be performed to one pair of fiber distances or additional distances. In some implementations, it may be advantageous to acquire an entire OFDR or OTDR trace for the FUT 100 with sufficiently spatial and sampling resolutions, and then to select the different distance steps for the signal (data) processing regarding to the bend radius, bend length, and other parameters.

The following describes one example of a method of operation of the OTDR based wavelength-dependent-loss measurement for the distributed measurement of fiber bend or stress prosperities as a function of FUT length.

The user first causes the system to initialize the OTDR, specifically initializing the pulsed light source 22, the OTDR detection and processing section, acquisition for the N (N≥2) high spatial-resolved OTDR traces at N different wavelengths where at least one wavelength OTDR trace would be sensitive to the bend induced fiber loss or attenuation. In particular such wavelength is set at a long wavelength region, for example from 1600 nm or beyond 1675 nm. It should be appreciated to be understood that the longer wavelength is, the more sensitive it is to the fiber bend induced loss so as to obtain a more sensitive bend measurement. Otherwise, if there is no any bend induced loss at any wavelength, it is impossible to characterize the bend properties, such as bend radius, bend strength, bend length, etc. For most commercial OTDR, an InGaAs APD may be used. However, advantageously a Ge photodetector may be used and it is more sensitive to detect the light beyond 1650 nm. Other laser and detector may also be possible to be used, for example to use a laser wavelength >1700 nm pulsed DFB and a relevant photodetector that can detect the light beyond wavelength 1700 nm. Indeed such laser and photodetector are commercially available.

The instrument then calculates the fiber loss or attenuation at the same fiber location for different wavelengths, where at least one loss must be extracted from one wavelength, and then further compute their differences or at least one such said difference. If there may be a loss difference between any two OTDR measurements, then a bend on the FUT may be determined and any loss from any wavelength can be used to estimate the bend properties, but a higher loss at a longer wavelength may be used to determine these macro-bend characteristics. If there is only one measured loss at a longest or longer wavelength but there is no any other losses at other wavelengths, one could also determine a bend characteristics of the test fiber.

The instrument will further perform a computation of the fiber bend radius or strength according to the measured fiber loss or attenuation and the fiber wavelength dependent bend coefficient, for example by using a factory calibrated wavelength dependent bend coefficient for a known fiber type. Note it is an advantage to have more than one measured fiber losses so as to have an accurately bend characterization.

Therefore the bend radius or bend strength as well a bend length will be estimated, respectively.

The last step will compute fiber bend characteristics as a function of distance (z) along the FUT, for example fiber quality, fiber reliability, lifetime and failure statistics.

It should be appreciated to be understood that above steps might also be used for the photon counting OTDR operation after an OTDR trace is acquired.

It should also be noted that for an OFDR operation the acquisition is firstly obtaining an time domain signal and then to obtain a spatial domain OFDR trace (similar as OTDR trace) after a FFT operation, and then above steps could be used.

Data Structure, Calibration and Computation

Spatial Domain Data Structure—After the OTDR data acquisition or after a FFT operation of the OFDR data acquisition for at least two lasers with different wavelengths, a new matrix data structure (D1) is obtained that comprises K groups OTDR traces as a function of distance (z), each consisting of N points corresponding to N values of distance $z_n$ for K different laser central wavelengths, where n=1 . . . N, for totally K different wavelength lasers:

| | | | (D1) | | |
|---|---|---|---|---|---|
| $\lambda_1$ | $P_1(z_1)$ | ... | $P_1(z_n)$ | ... | $P_1(z_N)$ |
| ... | ... | ... | ... | ... | ... |
| $\lambda_k$ | $P_k(z_1)$ | ... | $P_k(z_n)$ | ... | $P_k(z_N)$ |
| ... | ... | ... | ... | ... | ... |
| $\lambda_K$ | $P_K(z_1)$ | ... | $P_K(z_n)$ | ... | $P_K(z_N)$ |

Fiber Coefficient Measurement/Calibration for Known Fibers—For the currently optical network fiber link installation, mostly the fiber types might be known, for example for the FTTH access network standard optical fiber of G.652, G.657(.A, B, etc.). It is necessary to measure the "threshold" bend radius or a fitting coefficient $R_{th}$ and the fiber type related bend or stress coefficient or a fitting coefficient $\eta(\lambda)$ and then users can select a properly fiber "threshold" bend radius $R_{th}$ and the fiber type related bend or stress coefficient $\eta(\lambda)$ or even to input the fitting coefficients for them regarding the FUT fiber type so that the fiber bend characteristics could be accurately calculated. This fiber bend coefficient measurement or calibration could be done/calibrated at the factory or by user.

In the field if user may not know the fiber type, it may also be possible to identify the fiber type by performing a fiber bend induced loss measurement for at least one wavelength, for example to bend the fiber to have at least one and, in some cases, two known radius, e.g. of 10 mm, and then such fiber bend fitting coefficients can be measured and calibrated.

Signal Processing of Distributed Bend or Stress Measurement Based on Wavelength-Dependent-Loss Analysis Method—As described above that the single-mode fiber, e.g. G.652, G.657, has different mode field diameter (MDF) for different wavelengths and a mode field diameter increases via wavelength increases so as to have an increased bend induced loss, for example a MFD at 1550 nm is bigger that of 1310 nm and a MFD at 1650 nm is bigger than that of at 1550 nm and 1310 nm, therefore a macro-bend loss is larger in the longer wavelength than that of a short wavelength because a bend loss is proportional to the MFD. Thus there is a difference for the band losses between different wavelengths. Also the bend induced loss can distinguished from other losses if bend losses can be measured at at least for two different wavelengths, e.g. at 1550 nm and 1650 nm or 1625 nm and 1675 nm (even beyond 1700 nm for an improved bend sensitive test and measurement), etc. This is because other losses have less or negligible wavelength dependence. Such losses can be measured by an OTDR or PC-OTDR or OFDR, as shown in embodiments FIGS. 1, 2, 3 and 4. Since most bend radius and length is small in the FTTH fiber installation, e.g. several mm and sew cm, a high spatial resolved reflectometry, for example a modified short pulse and wide detection bandwidth commercial OTDR, or a high spatial-resolved OFDR and PC-OTDR, should be used. Based on knowing the loss from macro-bending at a given wavelength for the measurement, a bend radius or bend strength can be estimated (see below section) by knowing a fiber type and using a factory (or user) calibrated wavelength dependent bend coefficient $\eta(\lambda)$ that is a constant dependent on the optical wavelength, $\lambda$, and fiber properties, e.g. fiber cladding radius, refraction index, etc., and also a bend length can be measured from a measured OTDR or OFDR trace.

After the measurement of backreflected light power (e.g. Rayleigh Back Scattering) or fiber macro-bend loss (attenuation) at different wavelengths by an OTDR or OFDR, a loss between two different fiber distance $z_S$ and $z_L$ can be obtained. If there may be a fiber bend then such losses may come fiber bend and can be distinguished from other losses as described above, i.e. bend losses are different at different wavelengths. The fiber bend loss can be expressed as, $$\Delta L_{\lambda_i - dB}(z, \lambda) = 5 \cdot \log_{10} \left( \frac{P\left(z - \frac{1}{2}\Delta z, \lambda\right)}{P\left(z + \frac{1}{2}\Delta z, \lambda\right)} \right) \quad (1)$$

or it may be written as, $$\Delta L_{\lambda_i - dB}(z, \lambda) = \left| 5 \cdot \log_{10} \left( \frac{P\left(z - \frac{1}{2}\Delta z, \lambda\right)}{P\left(z + \frac{1}{2}\Delta z, \lambda\right)} \right) \right| \quad (1')$$

where $P(z,\lambda)$ is the measured backreflected light power at a distance z and at a wavelength $\lambda$, and i (i=1 ... I, I>1) is an index for the laser wavelength number.

In some implementations, for the measurement of the wavelength-dependent loss at a specified distance z for each said group comprises distance pairs having substantially said prescribed center distance, and the said bend- or stress-related FUT characteristic is the wavelength-dependent loss values, $\Delta L_{\lambda_j - dB}(z,\lambda)$, at least two different wavelengths, at the said at least one wavelength-dependent loss value is measured at L or UL band of the telecommunication bands or even at the further longer wavelengths.

After the calculation of the bend or stress induced wavelength-dependent loss parameter $\Delta L_{\lambda_j - dB}(z,\lambda)$ as in Eq. (1) or (1'), the bend radius or bend or stress strength can be computed from the bend induced wavelength-dependent loss parameter, $\Delta L_{\lambda_j - dB}(z,\lambda)$, according to a predetermined function as the following formula [xxx], formula, $$R(z) = R_{th} - \frac{\Delta L_{\lambda_j - dB}(z, \lambda)}{\eta(\lambda) \cdot \Delta z} \quad (2)$$

where the $R(z)$ is the bend radius, the $R_{th}$ is defined as a "threshold" bend radius where for this "threshold" bend radius there is no any or negligible bend or stress induced attenuation or loss on the optical fiber, and the $\eta(\lambda)$ is the fiber type related bend or stress coefficient or simple as a fitting coefficient. Note that $R_{th}$ and $\eta(\lambda)$ could either from theoretical numerical simulations or from experimental calibrations, for example for a given optical fiber the $R_{th}$ and $\eta(\lambda)$ can be obtained from at least two bend induced loss measurements for two different bend radius. The $\Delta L_{\lambda_j - dB}(z, \lambda)$ is a bend or stress induced loss without any non bend- or stress-related losses and depends on the optical wavelength, $\lambda$, and fiber properties, e.g. fiber cladding radius, refraction index, etc., $\Delta z$ is the bend distance or a portion of bend or stress length. $\Delta L_{\lambda_j - dB}(z,\lambda)$ is a bend or stress induced loss at a given wavelength for a bend distance $\Delta z$. The bend or stress parameter may be a bend or stress radius $R(z)$ or a bend or stress strength that is computed from the bend or stress induced wavelength-dependent loss parameter, $\Delta L_{\lambda_j - dB}(z,\lambda)$, at a said given wavelength, $\lambda$, e.g., from a long wavelength, for example a bend or stress radius $R(z)$ could be computed from said predetermined function according to the equation (2).

It should be noted that the $\Delta L_{\lambda_j - dB}(z,\lambda)$ does not include the non-bend or -stress related loss that may usually be dependent on the wavelength, for example dependent on the $1/\lambda^4$.

It is appreciated that equation (2) is not the only formula but it could other formulas that may come from theoretical analysis, simulations and experiments.

It should also be noted that the $\eta(\lambda)$ could be obtained from a factory calibration from known fiber type, or a user field reference measurement in the field by introducing a known bend radius (diameter) on the test fiber (i.e. FUT) or other source or method, for example by knowing fiber characteristics, e.g. standard fibers G.652, G.655, G.657, etc.

The bend radius may be computed from the said bend induced wavelength-dependent loss parameter, $\Delta L_{\lambda_j - dB}(z,\lambda)$, from the longest wavelength according to the said predetermined function.

The said $R_{th}$ and $\eta(\lambda)$ coefficients could be extracted from either experimental testing or theoretical analysis or simulations, for example for a given optical fiber the $R_{th}$ and $\eta(\lambda)$ can be obtained from at least two bend induced loss measurements from at least one wavelength for at least two different bend radius and then the $R_{th}$ and $\eta(\lambda)$ could be extracted according to the equation (2); or the said $R_{th}$ and $\eta(\lambda)$ can be obtained from at least two bend induced loss measurements for two different wavelengths for at least one bend radius and then the $R_{th}$ and $\eta(\lambda)$ could be extracted according to according to the equation (2).

The bend parameter may be a bend length that is measured from the different optical power difference (i.e. fiber loss) according to the said bend induced wavelength-dependent loss parameter, $\Delta L_{\lambda_j - dB}(z,\lambda)$, at at least one wavelength, e.g., from the longest wavelength.

In some cases, at least one bend or stress related fiber characteristics, for example a mechanical reliability and or an expect lifetime or a failure rate statistics for bending of a fiber, is calculated as one predetermined function of said the at least one bend related FUT characteristics along an optical fiber path.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is:

1. An optical time domain reflectometer (OTDR) device, comprising:
 a light source that produces probe light at different optical wavelengths;
 an optical unit that includes a first optical port to receive the probe light produced by the light source, a second optical port coupled to a fiber link under test to direct the probe light received at the first optical port to the fiber link under test and receive reflected probe light from the fiber link under test, and a third optical port that outputs the received reflected probe light;

an optical detector coupled to receive the reflected probe light from the third optical port of the optical unit to produce detector signals; and a signal processor that processes information from the detector signal to perform:

computing a first optical power difference in reflected optical signals from two different locations in the fiber link under test at each of two or more different optical wavelengths that are contained in the detector signals;

computing a second optical power difference in reflected optical signals from each of the two different locations in the fiber under test at the two or more different optical wavelengths that are contained in the detector signals;

using information on the first and second optical power differences to obtain optical loss caused by a fiber bend or stress present in the fiber link under test; and using the optical loss caused by a fiber bend or stress present in the fiber link under test to determine a parameter of the fiber bend or stress.

2. The device as in claim 1, wherein the light source includes a tunable light source that tunes to the different optical wavelengths.

3. The device as in claim 1, further comprising a circuit that processes the detector signals to produce an output to be processed by the signal processor.

4. The device as in claim 1, further comprising a control that is coupled to the light source to control generation of the probe light at the different optical wavelengths and is further coupled to the signal processor.

5. The device as in claim 1, wherein the parameter of the fiber bend or stress includes a fiber bend length.

6. The device as in claim 1, wherein the parameter of the fiber bend or stress includes a fiber bend radius.

7. The device as in claim 1, wherein the parameter of the fiber bend or stress includes a fiber type of the fiber link under test.

8. The device as in claim 1, wherein the light source includes different light sources at different wavelengths.

9. The device as in claim 8, wherein the optical unit includes an optical coupler.

10. The device as in claim 8, wherein the optical unit includes an optical backreflection extractor.

11. A method for using optical time domain reflectometer (OTDR) to measure a fiber link under test, comprising:

operating a light source to produce probe light at different optical wavelengths;

directing the probe light into a fiber link under test;

directing reflected probe light from the fiber link under test into an optical detector to produce detector signals;

processing information from the detector signals to determine a fiber bend or stress present in the fiber link under test, wherein the processing includes:

computing a first optical power difference in reflected optical signals from two different locations in the fiber link under test at each of two or more different optical wavelengths that are contained in the detector signals;

computing a second optical power difference in reflected optical signals from each of the two different locations in the fiber link under test at the two different optical wavelengths that are contained in the detector signals;

using information on the first and second optical power differences to obtain optical loss caused by a fiber bend or stress present in the fiber link under test; and using the optical loss caused by a fiber bend or stress present in the fiber link under test to determine a parameter of the fiber bend or stress.

12. The method as in claim 11, wherein the parameter of the fiber bend or stress includes a fiber bend length.

13. The method as in claim 11, wherein the parameter of the fiber bend or stress includes a fiber bend radius.

14. The method as in claim 11, wherein the parameter of the fiber bend or stress includes a fiber type of the fiber link under test.

* * * * *